(12) United States Patent
Yu

(10) Patent No.: US 10,135,867 B2
(45) Date of Patent: Nov. 20, 2018

(54) DYNAMICALLY UPDATED COMPUTING ENVIRONMENTS FOR DETECTING AND CAPTURING UNAUTHORIZED COMPUTER ACTIVITIES

(71) Applicant: BANK OF AMERICA CORPORATION, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 237 days.

(21) Appl. No.: 14/962,597

(22) Filed: Dec. 8, 2015

(65) Prior Publication Data
US 2017/0163682 A1    Jun. 8, 2017

(51) Int. Cl.
| G06F 8/65 | (2018.01) |
| G06F 21/00 | (2013.01) |
| G06F 21/57 | (2013.01) |
| H04L 29/06 | (2006.01) |

(52) U.S. Cl.
CPC ............ H04L 63/1491 (2013.01); G06F 8/65 (2013.01); H04L 63/1416 (2013.01)

(58) Field of Classification Search
CPC . H04L 63/1491; H04L 63/1416; H04L 41/20; G06F 8/65; G06F 21/566
See application file for complete search history.

(56) References Cited

U.S. PATENT DOCUMENTS

| 7,774,459 B2 * | 8/2010 | Wang ................ H04L 63/1416 709/224 |
| 9,462,013 B1 * | 10/2016 | Boss .................. H04L 63/1491 |
| 9,485,276 B2 * | 11/2016 | Quinlan ............. H04L 63/1491 |
| 9,560,075 B2 * | 1/2017 | Goldberg ................ G06F 17/27 |

(Continued)

OTHER PUBLICATIONS

"Test orchestration a framework for Continuous Integration and Continuous deployment" Nikhil Rathod; Anil Surve 2015 International Conference on Pervasive Computing (ICPC) Year: 2015 IEEE Conference Publications.*

(Continued)

*Primary Examiner* — Jung W Kim
*Assistant Examiner* — Sameera Wickramasuriya
(74) *Attorney, Agent, or Firm* — Michael A. Springs; Moore & Van Allen PLLC; Peter B. Stewart

(57) ABSTRACT

Disclosed is a computerized system for dynamically updating a honeypot computer environment. The system typically includes a processor, a memory, and a honeypot management module stored in the memory. The system for is typically configured for: creating a honeypot environment within a computer network, the honeypot environment comprising a software application, wherein the computer network has one or more other environments, the honeypot environment being isolated from the other environments of the computer network; receiving an update to the software application for implementation in at least one of the other environments of the computer network; and, based on receiving the update to the software application for imple- (Continued)

mentation in at least one of the other environments of the computer network, automatically implementing the update to the software application within the honeypot environment.

21 Claims, 3 Drawing Sheets

(56) References Cited

U.S. PATENT DOCUMENTS

| | | | | |
|---|---|---|---|---|
| 2004/0128543 A1* | 7/2004 | Blake | ............ | H04L 63/0227 726/25 |
| 2005/0166072 A1* | 7/2005 | Converse | ............ | H04L 63/1441 726/5 |
| 2008/0115213 A1* | 5/2008 | Bhatt | ............ | G06F 21/316 726/22 |
| 2008/0141374 A1* | 6/2008 | Sidiroglou | ............ | G06F 21/554 726/23 |
| 2012/0167208 A1* | 6/2012 | Buford | ............ | H04L 63/1491 726/22 |
| 2014/0096229 A1* | 4/2014 | Burns | ............ | H04L 63/1491 726/15 |
| 2016/0323301 A1* | 11/2016 | Boss | ............ | H04L 63/1416 |
| 2017/0134405 A1* | 5/2017 | Ahmadzadeh | ............ | H04L 63/1416 |

OTHER PUBLICATIONS

B. K. Alese, F. M. Dahunsi, R. A. Akingbola, O. S. Adewale and T. J. Ogundele, "Improving deception in honeynet: Through data manipulation," The 9th International Conference for Internet Technology and Secured Transactions (ICITST-2014), London, 2014, pp. 198-204. (Year: 2014).*

* cited by examiner

DYNAMICALLY UPDATED COMPUTING ENVIRONMENTS FOR DETECTING AND CAPTURING UNAUTHORIZED COMPUTER ACTIVITIES

FIELD OF THE INVENTION

The present invention embraces a system for dynamically updating a honeypot computer environment. The system typically includes a processor and a memory. The system also typically includes a honeypot management module stored in the memory, which is typically configured for: receiving an update to a software application for implementation in another environment of a computer network; and, based on receiving the update to the software application, automatically implementing the update to the software application within a honeypot environment.

BACKGROUND

A honeypot is a computer resource that is configured to mimic a normal computing environment, such as a production or testing environment, within a computer network. Typically, a honeypot does not provide production value within the computer network. Instead, the honeypot acts as a decoy so that individuals wishing to gain unauthorized access to the computer network attack the honeypot rather than a more valuable area of the computer network. In addition, the honeypot may be configured to detect unauthorized access and even neutralize attacks on the computer network. That said, a need exists for an improved way of deploying honeypots within a computer network.

SUMMARY

In one aspect, the present invention embraces a computerized system for dynamically updating a honeypot computer environment and an associated method and computer program product. The system typically includes a processor and a memory. The system also typically includes a honeypot management module stored in the memory and executable by the processor. In one embodiment, the honeypot management module is configured for: creating a honeypot environment within a computer network, the honeypot environment comprising a software application, wherein the computer network has one or more other environments, the honeypot environment being isolated from the other environments of the computer network; receiving an update to the software application for implementation in at least one of the other environments of the computer network; and, based on receiving the update to the software application for implementation in at least one of the other environments of the computer network, automatically implementing the update to the software application within the honeypot environment.

In a particular embodiment, the honeypot management module is configured for monitoring a continuous development and integration pipeline to detect the update to the software application for implementation in at least one of the other environments of the computer network.

In another particular embodiment, receiving the update comprises detecting the update, and automatically implementing the update to the software application within the honeypot environment comprises automatically implementing the update to the software application within the other environments of the computer network.

In another particular embodiment, the other environments of the computer network comprise a production environment and a development environment. In addition, receiving an update to the software application for implementation in at least one of the other environments of the computer network may include detecting that the update is scheduled for implementation within the production environment.

In another particular embodiment, the honeypot management module is configured for regulating network traffic entering or leaving the honeypot environment.

In another particular embodiment, the honeypot management module is configured for detecting unauthorized access to the honeypot environment and collecting data regarding the unauthorized access to the honeypot environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
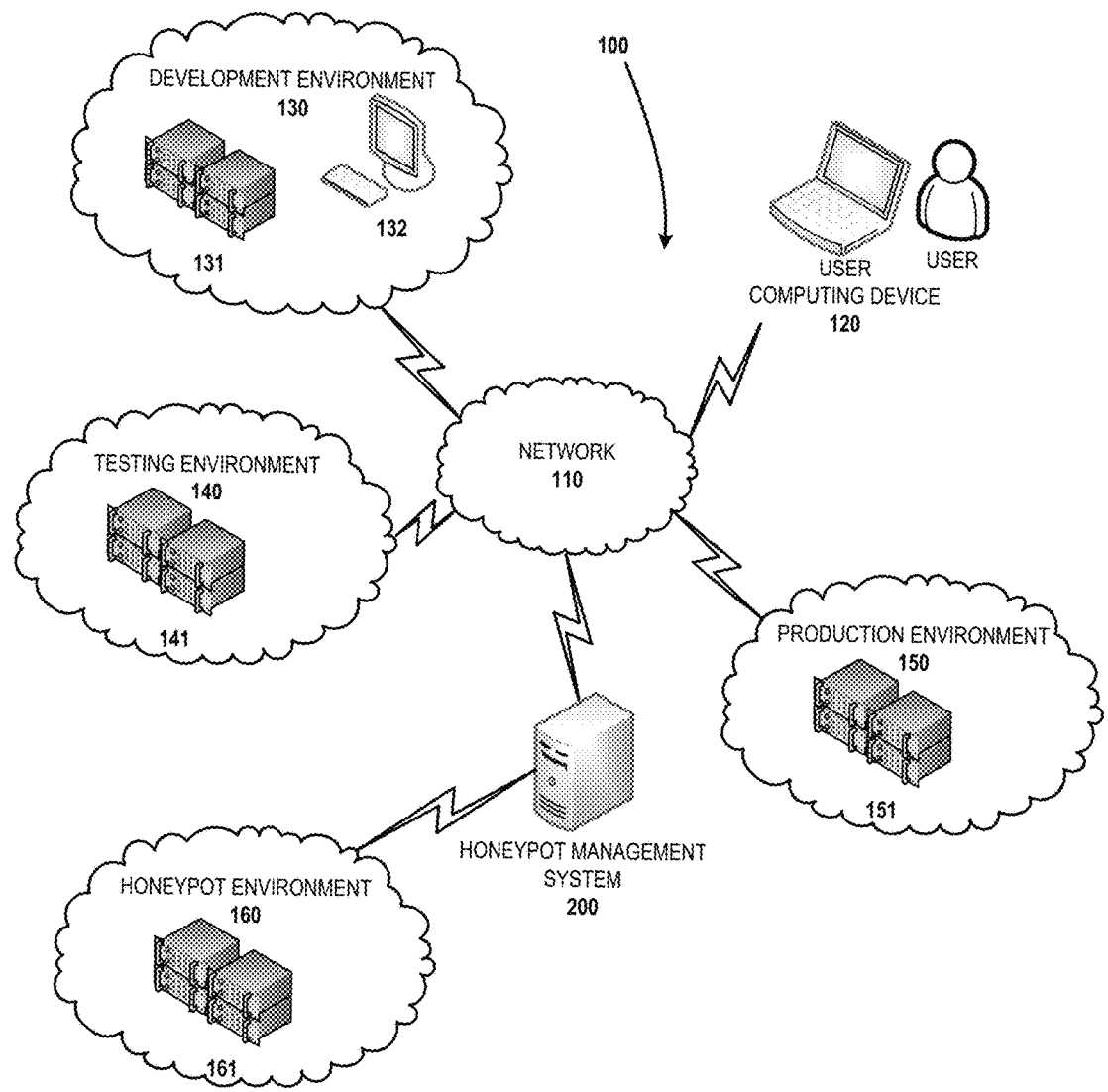
Figure 2:
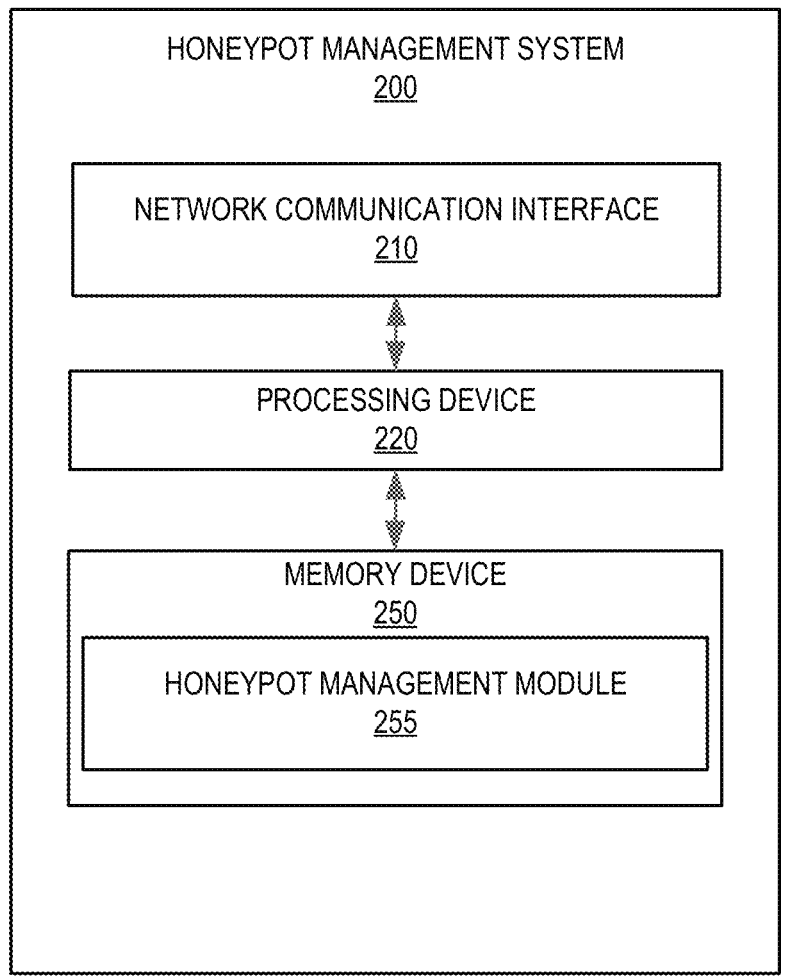
Figure 3:
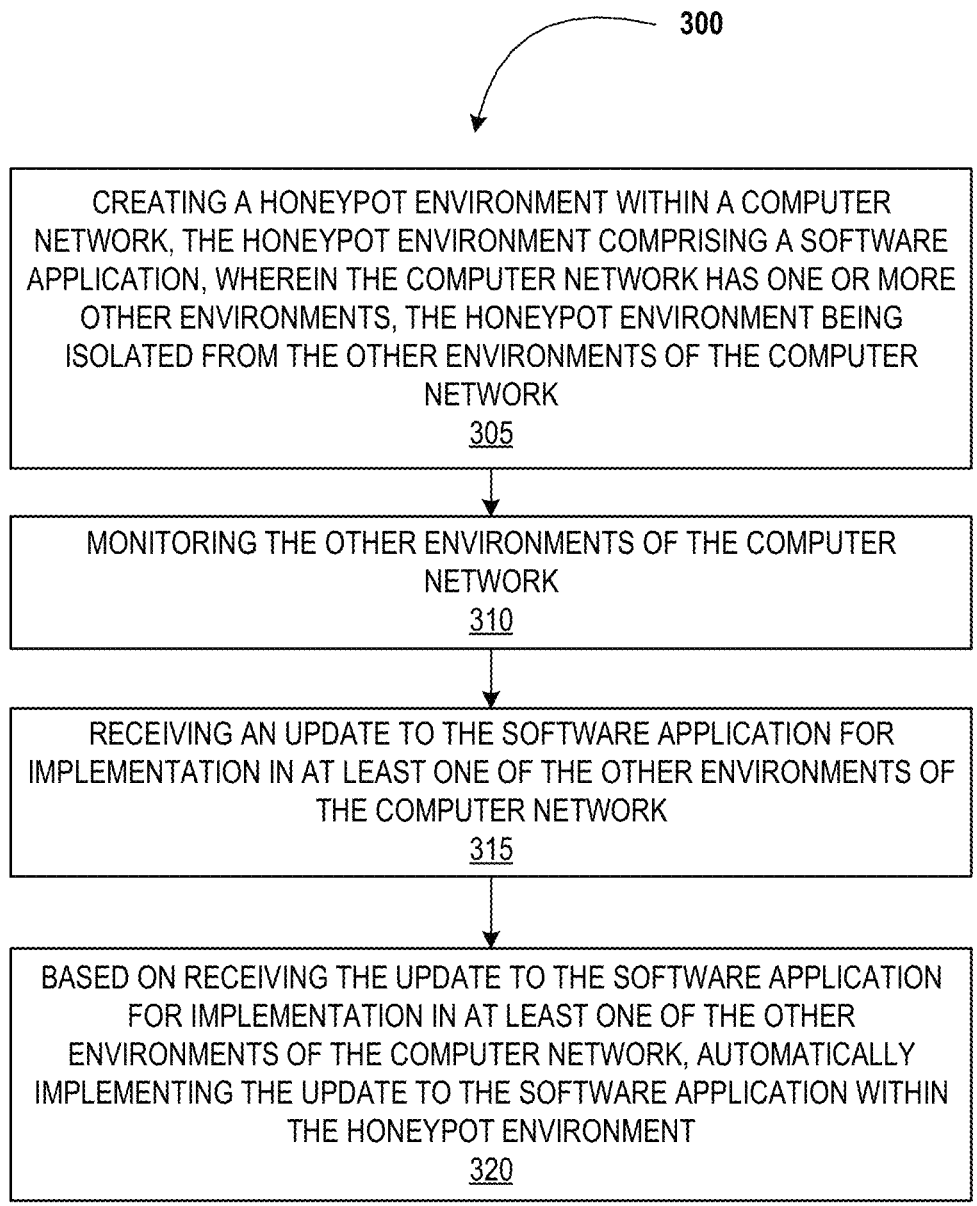

Having thus described embodiments of the invention in general terms, reference will now be made the accompanying drawings, wherein:

FIG. 1 depicts a honeypot management system and operating environment in accordance with an exemplary embodiment of the present invention;

FIG. 2 schematically depicts a honeypot management system in accordance with an exemplary embodiment of the present invention; and FIG. 3 depicts a method of dynamically updating a honeypot computer environment in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a honeypot management system described herein. A "user" may be any person or entity using a honeypot management system described herein. Often, a user is an employee of the entity. In other instances, a user is a customer of the entity, who may be accessing a computer system of the entity in order to receive services from the entity. In some instances, a user may be an unauthorized user who attempts to gain unauthorized access portions of an entity computer system.

In one aspect, the present invention embraces a system that may be used to dynamically update a honeypot environment. In this regard, one or more software applications are installed within the honeypot environment. The system typically is configured to receive updates to these software applications that have been implemented or are being implemented within other computer environments. Thereafter, such as if the system identifies a software update that has been implemented or is being implemented within another computer environment, the system then automatically implements the software update within the honeypot environment.

By automatically implementing such software updates from other environments within the honeypot environment, the honeypot environment may appear, from the perspective of an unauthorized user, to have the same characteristics as a normal computing environment, such as a production or testing environment. In this regard, one of the problems associated with a honeypot environment is that if an unauthorized user detects the honeypot environment, the unauthorized may attempt to bypass the honeypot environment. For example, an unauthorized user may be able to detect a honeypot environment, if the honeypot environment does not appear to perform the same activities a normal environment (e.g., a production environment) would be expected to perform, or if the honeypot environment appears stale or inactive. Although a honeypot environment can be actively managed to increase the likelihood that the honey environment appears to act like and have the characteristics of a normal environment, such active management requires extensive resources (e.g., computer and/or personnel resources). By automatically implementing software updates from other environments within the honeypot environment, the likelihood that the honeypot environment appears stale to unauthorized users can be significantly reduced without requiring the extensive resources needed for active management of the honeypot environment.

FIG. 1 depicts an operating environment 100 according to one embodiment of the present invention. The operating environment 100 includes a plurality of computer environments. Typically, the operating environment includes a plurality of normal computer environments, such as a development environment 130, a testing environment 140, and a production environment 150. A development environment is a computer environment in which new software applications and updates to existing software applications may be developed. A testing environment is a computer environment in which new software applications and software updates may be tested (e.g., user acceptance testing may be performed). A production environment is a computer environment in which software applications are used (e.g., in real time) by end users, such an employees or customers of the entity that operates the operating environment 100. Although not depicted in FIG. 1, it is within the scope of the present invention for the operating environment 100 to include other computer environments, such as a staging environment, a quality assurance environment, or a backup environment. Each computer environment includes one or more computing devices, such as a server or workstation. For example, the development environment 130 may include one or more servers 131 and one or more developer workstations 132, the testing environment 140 may include one or more servers 141, and the production environment 150 may include one or more servers 151. In addition, each computer environment includes one or more software applications installed on such computing devices.

As depicted in FIG. 1, the operating environment includes a honeypot environment 160, which includes one or more computing devices (e.g., one or more servers 161), and a honeypot management system 200. The honeypot environment 160 is typically configured to act as a decoy so that individuals wishing to gain unauthorized access to the entity's computer network attack the honeypot environment rather than a more valuable area of the entity's computer network, such as the production environment 150. In addition, the honeypot environment 160 may be configured to detect unauthorized access and even neutralize attacks on the entity's computer network. To ensure that an unauthorized user who gains access to the honeypot environment 160 is unable to access other areas of the entity's computer network, the honeypot environment 160 is typically isolated from the other computer environments of the entity's computer network. Accordingly, a gateway and/or firewall may separate the honeypot environment 160 from the other computer environments of the entity's computer network. In other words, such gateway and/or firewall may be configured to regulate the network traffic entering or leaving the honeypot environment 160. Although such gateway and/or firewall may include security features that impede unauthorized access to the honeypot environment 160, such security features may be less robust than security features protecting other computer environments within the entity's computer network, thereby making it more likely an unauthorized user will gain access to the honeypot environment 160 than to another computer environment. In addition, security features within the honeypot environment 160 may be less robust that the security features within other computer environments (e.g., the production environment 150). For example, software applications installed within the honeypot environment 160 may employ default passwords, whereas software applications installed within other computer environments may employ more rigorous passwords.

The honeypot management system 200 and each computer environment of the operating environment is typically in communication with a network 110, such as the Internet, wide area network, local area network, Bluetooth network, near field network, or any other form of contact or contactless network. One or more users, each having a user computing device 120, such as a PC, laptop, mobile phone, tablet, television, mobile device, or the like, may be in communication with the computer environments, such as the development environment 130, the testing environment 140, and the production environment 150, via the network 110. In some instances users may directly use a computing device within a computer environment. For example, an employee of the entity may use a developer workstation 132 within the development environment 130.

FIG. 2 depicts the honeypot management system 200 in more detail. As depicted in FIG. 2, the honeypot management system 200 typically includes various features such as a network communication interface 210, a processing device 220, and a memory device 250. The network communication interface 210 includes a device that allows the honeypot management system 200 to communicate with the honeypot environment 160, other computer environments, and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the honeypot environment 160 is typically isolated from the other computer environments of the entity's computer network. Accordingly, in some embodiments the honeypot management system 200 is configured to act as a gateway and/or firewall that isolates the honeypot environment 160 by regulating the network traffic entering or leaving the honeypot environment 160. In other embodiments, regulating the network traffic entering or leaving the honeypot environment 160 may be performed by a separate system.

In some embodiments, the honeypot management system 200 may be configured to detect unauthorized access to the honeypot environment 160, collect data regarding any such unauthorized access, and/or analyze such data. In a particular embodiment, based on detecting unauthorized access to the honeypot environment 160, the honeypot management system 200 may be configured to transmit an alert to a user computer device regarding the unauthorized access or, in some instances, cause the user computer device to display a graphical user interface that includes information regarding the unauthorized access. That said, in other embodiments these functions may be performed by a separate system. By collecting data regarding unauthorized access and analyzing such data, security features protecting other computer environments within the entity's computer network can be improved.

As noted, the honeypot management system 200 is configured to manage the honeypot environment 160 by automatically implementing software updates to software applications installed within the honeypot management system. Accordingly, the honeypot management system 200 typically includes one or more modules stored in the memory device 250, which facilitate management of the honeypot environment 160. As depicted in FIG. 2, the system 200 typically includes a honeypot management module 255.

In this regard, FIG. 3 depicts a method 300 of dynamically updating a honeypot computer environment that may be performed by the honeypot management module 255.

Initially. At block 305, the honeypot environment 160 is created within the entity's computer network. The honeypot environment 160 is typically configured to mimic the appearance and functions of other computer environments within the entity's computer network. Accordingly, one or more software applications may be installed within the honeypot environment 160. The software applications installed within the honeypot environment 160 are typically the same or similar to software applications installed in another computer environment of the entity's computer network. For example, if the honeypot environment 160 is configured to mimic the production environment 150, software applications installed within the production environment may also be installed within the honeypot environment 160. As noted, the honeypot environment 160 may be configured so that is it isolated from the other computer environments of the entity's computer network (e.g., via a gateway or firewall). Accordingly, in some embodiments, the honeypot management module 255 may be configured to regulate the network traffic entering or leaving the honeypot environment 160.

At block 310, the honeypot management module 255 may monitor one or more other environments of the entity's computer network to detect updates to the software applications installed within the honeypot environment 160. As used herein, an update may be any revision to a software application. An update may be a minor patch or upgrade that fixes a bug and/or improves functionality of a software application. An update may also be a major upgrade (e.g., a new version) that includes significant changes and/or adds significant functionality to a software application.

In some embodiments, the entity's computer network is configured for continuous software integration and deployment. In continuous software integration and deployment, changes made to software code during development are regularly integrated with the mainline of code. The updated software is then tested, and, if the testing is successful, the updated software is deployed (e.g., to a production environment). Aspects of this continuous software integration and deployment may be automated, such as via a development and integration system. Accordingly, in some embodiments monitoring the other environments of the entity's computer network to detect updates may include monitoring (e.g., continuously monitoring) a continuous development and integration pipeline, which may be provided by such a development and integration system, to identify updates in the process of being deployed in other environments. In other embodiments, the honeypot management system 200 may either include or be part of a development and integration system, and the honeypot management system 200 may be configured to automatically implement updates within the honeypot environment 160 that are being implemented in other computer environments. In this regard, the honeypot management system 200 and/or development and integration system may receive (e.g., from a software developer) a software update to be integrated and deployed. Thereafter, the software update may be implemented not only within normal computer environments, but also within the honeypot environment 160.

In alternative embodiments, the honeypot management module 255 might not monitor one or more other environments of the entity's computer network to detect updates.

Instead, the honeypot management module 255 may simply receive software updates (e.g., as described with respect to block 315).

At block 315, the honeypot management module 255 receives a software update for implementation in at least one of the other environments of the entity's computer network. For example, the honeypot management module 255 may detect that a software update to one of the software applications installed in the honeypot environment has been implemented or is scheduled for implementation in another environments of the entity's computer network, such as the production environment 150. Thereafter, the honeypot management module 255 may retrieve the software update. In some embodiments, the honeypot management module 255 may identify a software update within a continuous development and integration pipeline. In other embodiments, a development and integration system or a software developer may submit or otherwise transmit a software update to the honeypot management module 255.

Based on receiving the software update, at block 320, the honeypot management module 255 automatically implements the software update within the honeypot environment 160. In other words, the software update is installed within the honeypot environment 160 so that the applicable software application is updated. In some embodiments (e.g., if the honeypot management system 200 includes or is part of a development and integration system), the honeypot management module 255 may also automatically implement the software update within the other environments of the entity's computer network.

Thereafter, the steps described with respect to blocks 310-320 may be repeated (e.g., on a regular and/or continuous basis). Accordingly, the honeypot environment 160 may be continually updated as the other environments of the entity's computer network are updated.

In some embodiments, the honeypot management module 255 may be configured to detect unauthorized access to the honeypot environment 160, collect data regarding any such unauthorized access, and/or analyze such data. In a particular embodiment, based on detecting unauthorized access to the honeypot environment 160, the honeypot management module 255 may be configured to automatically transmit an alert to a user computer device regarding the unauthorized access or, in some instances, automatically cause (e.g., in near real time) the user computer device to display a graphical user interface that includes information regarding the unauthorized access. These steps may be performed based on continuous monitoring of the honeypot environment 160 by the honeypot management module 255.

As evident from the preceding description, the system described herein represents an improvement in technology by identifying software updates within other computer environments and then automatically installing these software updates within a honeypot environment. Accordingly, the system provides a technical solution for overcoming the problem of a honeypot environment appearing stale and, thus, susceptible to detection. Indeed, by automatically implementing updates from other environments within a honeypot environment, the likelihood that the honeypot environment appears stale to unauthorized users can be significantly reduced.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized system for dynamically updating a honeypot computer environment, comprising:
a computer apparatus including a processor, a memory, and a network communication device; and
a honeypot management module stored in the memory, executable by the processor, and configured for:
creating a honeypot environment within a computer network, the honeypot environment comprising a software application, wherein the computer network has one or more other environments, the one or more other environments comprising a production environment, the honeypot environment being isolated from the other environments of the computer network;
monitoring a continuous development and integration pipeline to detect an update to the software application that is scheduled for implementation in the production environment of the computer network;
receiving the update to the software application; and
in response to detecting that the update to the software application is scheduled for implementation in the production environment of the computer network, automatically implementing the update to the software application within the honeypot environment as the update is implemented in the production environment.

2. The computerized system for dynamically updating a honeypot computer environment according to claim 1, wherein the honeypot management module is configured for:
automatically implementing the update to the software application within the other environments of the computer network.

3. The computerized system for dynamically updating a honeypot computer environment according to claim 1, wherein the other environments of the computer network comprise a development environment.

4. The computerized system for dynamically updating a honeypot computer environment according to claim 1, wherein the honeypot management module is configured for regulating network traffic entering or leaving the honeypot environment.

5. The computerized system for dynamically updating a honeypot computer environment according to claim 1, wherein the honeypot management module is configured for detecting unauthorized access to the honeypot environment and collecting data regarding the unauthorized access to the honeypot environment.

6. The computerized system for dynamically updating a honeypot computer environment according to claim 1, wherein monitoring the continuous development and integration pipeline comprises continuously monitoring the continuous development and integration pipeline.

7. The computerized system for dynamically updating a honeypot computer environment according to claim 1, wherein the honeypot management module is configured for automatically implementing further updates to the software application within the honeypot environment as the further updates are implemented in the production environment.

8. A computer program product for dynamically updating a honeypot computer environment comprising a non-transitory computer-readable storage medium having computer-executable instructions for:
creating a honeypot environment within a computer network, the honeypot environment comprising a software application, wherein the computer network has one or more other environments, the one or more other environments comprising a production environment, the honeypot environment being isolated from the other environments of the computer network;
monitoring a continuous development and integration pipeline to detect an update to the software application that is scheduled for implementation in the production environment of the computer network;
receiving the update to the software application; and
in response to detecting that the update to the software application is scheduled for implementation in the production environment of the computer network, automatically implementing the update to the software application within the honeypot environment.

9. The computer program product for dynamically updating a honeypot computer environment according to claim 8, wherein the non-transitory computer-readable storage medium has computer-executable instructions for:
    automatically implementing the update to the software application within the other environments of the computer network.

10. The computer program product for dynamically updating a honeypot computer environment according to claim 8, wherein the other environments of the computer network comprise a development environment.

11. The computer program product for dynamically updating a honeypot computer environment according to claim 8, wherein the non-transitory computer-readable storage medium has computer-executable instructions for regulating network traffic entering or leaving the honeypot environment.

12. The computer program product for dynamically updating a honeypot computer environment according to claim 8, wherein the non-transitory computer-readable storage medium has computer-executable instructions for detecting unauthorized access to the honeypot environment and collecting data regarding the unauthorized access to the honeypot environment.

13. The computer program product for dynamically updating a honeypot computer environment according to claim 8, wherein monitoring the continuous development and integration pipeline comprises continuously monitoring the continuous development and integration pipeline.

14. The computer program product for dynamically updating a honeypot computer environment according to claim 8, wherein the non-transitory computer-readable storage medium has computer-executable instructions for automatically implementing further updates to the software application within the honeypot environment as the further updates are implemented in the production environment.

15. A method of dynamically updating a honeypot computer environment, comprising:
    creating, via a computer processor, a honeypot environment within a computer network, the honeypot environment comprising a software application, wherein the computer network has one or more other environments, the one or more other environments comprising a production environment, the honeypot environment being isolated from the other environments of the computer network;
    monitoring, via a computer processor, a continuous development and integration pipeline to detect an update to the software application that is scheduled for implementation in the production environment of the computer network;
    receiving, via a computer processor, the update to the software application; and
    in response to detecting that the update to the software application is scheduled for implementation in the production environment of the computer network, automatically implementing, via a computer processor, the update to the software application within the honeypot environment.

16. The method of dynamically updating a honeypot computer environment according to claim 15, comprising:
    automatically implementing the update to the software application within the other environments of the computer network.

17. The method of dynamically updating a honeypot computer environment according to claim 15, wherein the other environments of the computer network comprise a development environment.

18. The method of dynamically updating a honeypot computer environment according to claim 15, further comprising regulating network traffic entering or leaving the honeypot environment.

19. The method of dynamically updating a honeypot computer environment according to claim 15, further comprising detecting unauthorized access to the honeypot environment and collecting data regarding the unauthorized access to the honeypot environment.

20. The method of dynamically updating a honeypot computer environment according to claim 15, wherein monitoring the continuous development and integration pipeline comprises continuously monitoring the continuous development and integration pipeline.

21. The method of dynamically updating a honeypot computer environment according to claim 15, further comprising automatically implementing further updates to the software application within the honeypot environment as the further updates are implemented in the production environment.

* * * * *